June 25, 1968   K. F. NOWAK   3,390,261
TRIM RING FOR AUTOMOBILE HEADLIGHTS AND DEVICE
FOR THE RETENTION THEREOF
Filed Nov. 8, 1965

INVENTOR.
KLAUS F. NOWAK

BY  Douglas S. Johnson

Agent 3,390,261
TRIM RING FOR AUTOMOBILE HEADLIGHTS
AND DEVICE FOR THE RETENTION THEREOF
Klaus Frederick Nowak, 442 Manor Road E.,
Toronto, Ontario, Canada
Filed Nov. 8, 1965, Ser. No. 506,722
Claims priority, application Germany, Oct. 9, 1965,
N 27,462
2 Claims. (Cl. 240—41.5)

ABSTRACT OF THE DISCLOSURE

A retaining spring adapted for use in automobile headlights for the purpose of retaining a trim ring to the reflector. The retaining spring having an intermediate portion with a bend which embraces the reflector edge on both sides with the ends of the spring bearing against the trim ring under spring tension.

---

This invention relates to a trim ring for automobile headlights and to a device for the retention thereof to the reflector.

Up to now trim rings for automobile headlights have been made of metal which was nickel or chrome-plated and then polished. Such rings have had, on their inner side, an undercut lip; a wire spring rested against this lip, also serving as a spacer in relation to the reflector. By fitting a plurality of such wire springs between the edge of the reflector and the trim ring, the latter was simultaneously attached to the reflector.

According to the invention, the trim ring is made of plastic instead of metal, more particularly of acrylonitrile butadiene styrol, a plastic capable of being metallized on its surface. Such rings have the appearance of chrome-plated metal parts, but are very much more corrosion-resistant than metal. They are also substantially easier to produce, since there is no welding, brazing or riveting and no application of protective coatings. Tool costs are also lower and the plastic ring weighs only half as much as the metal ring.

However, the plastic ring according to the invention has the disadvantage that the undercut lip, necessary to retain the known wire springs, cannot be produced by injection molding.

According to another concept of the invention, therefore, specially shaped retaining springs are used which need no undercutting in the tirm ring. In addition to this these new springs have the advantage that they hold better than known springs and are more easily fitted without tools.

In the retaining spring according to the invention these advantages are obtained by constructing the spring of a length of wire in which there is an intermediate portion having a bend which embraces the reflector edge on both sides with the ends of the spring bearing against the trim ring under spring tension. For this purpose the trim ring needs only to have a forwardly projecting, and not an undercut, portion.

The invention will now be described with reference to the accompanying drawings, in which.

Figure 1:
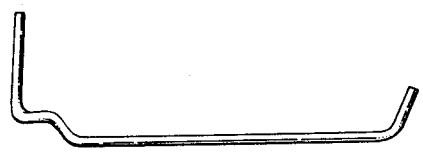
FIGURE 1 is a side view of a known retaining spring.
Figure 2:
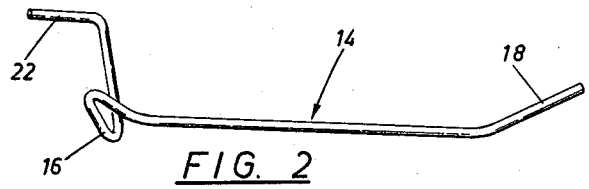
FIGURE 2 shows a retaining spring according to the invention seen from the same side as in FIGURE 1.
Figure 3:
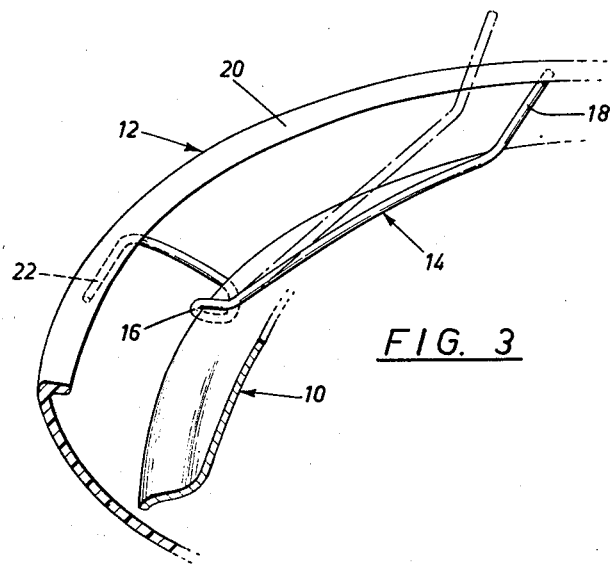
FIGURE 3 shows a perspective of an automobile headlight constructed according to the invention with the retaining spring inserted.

With reference to the drawings, FIGURE 1 shows a known retaining spring in which the ends are retained in an undercut portion of the perimeter of a conventional trim ring. Referring now to FIGURE 3 a reflector, generally designated by the numeral 10, is surrounded by a trim ring 12. A retaining spring, generally denoted by the numeral 14, see FIGURE 2, embraces the reflector 10 on both sides by means of an intermediate bend portion 16. One end 18 of the retaining spring 14 lies under the forwardly projecting edge 20 of the trim ring 12 and the other end 22 of the retaining spring 14 bears against the projecting edge 20 of the trim ring 12 under spring tension.

While certain embodiments have been illustrated and described for the purpose of disclosure, it will be understood that the invention is not limited thereto, but contemplates such modifications and other embodiments as may be utilized without departing from the invention.

I claim:
1. For an automobile headlight including a reflector and a trim ring made of plastic placed outwardly of said reflector and having formed therein a forwardly projecting portion, means for retaining said trim ring comprising a bent elongated wire spring having an intermediate portion bent so as to embrace said reflector on both sides thereof when in position, the ends of said spring being adapted to bear against said trim ring under said forwardly projecting portion in spring tension against said reflector.

2. The apparatus of claim 1 wherein said trim ring is made of acrylonitrile butadiene styrol.

References Cited

UNITED STATES PATENTS 2,131,828 10/1938 Williamson _____ 240—90
2,733,336  1/1956 Clayton _____ 240—41.5

NORTON ANSHER, *Primary Examiner.*

WINDHAM M. FRYE, RICHARD M. SHEER,
*Assistant Examiners.*